United States Patent [19]

Dempsey et al.

[11] 4,168,532

[45] Sep. 18, 1979

[54] MULTIMODE DATA DISTRIBUTION AND CONTROL APPARATUS

[75] Inventors: Gayle C. Dempsey, Needham; Richard P. Witt, Weston, both of Mass.

[73] Assignee: The United States of America as represented by the Secretary of the Air Force, Washington, D.C.

[21] Appl. No.: 771,598

[22] Filed: Feb. 24, 1977

[51] Int. Cl.² .............................................. G06F 3/04
[52] U.S. Cl. .................................................. 364/900
[58] Field of Search ........... 179/15 R, 15 BA, 15 BV, 179/15 AL; 364/200 MS File, 900 MS File

[56] References Cited

U.S. PATENT DOCUMENTS

| | | | |
|---|---|---|---|
| 3,851,104 | 11/1974 | Willard et al. | 179/15 BV X |
| 3,898,373 | 8/1975 | Walsh | 364/200 X |
| 3,905,025 | 9/1975 | Davis et al. | 364/200 |
| 4,002,843 | 1/1977 | Rackman | 179/15 AL |
| 4,053,950 | 10/1977 | Bourke et al. | 364/200 |

*Primary Examiner*—Gareth D. Shaw
*Assistant Examiner*—Thomas M. Heckler
*Attorney, Agent, or Firm*—Joseph E. Rusz; William Stepanishen

[57] ABSTRACT

A multiplex telecommunications system for simultaneously handling digital data, video and voice traffic on a local level using either broadband coaxial cable or optic fibers as a transmission medium.

5 Claims, 5 Drawing Figures

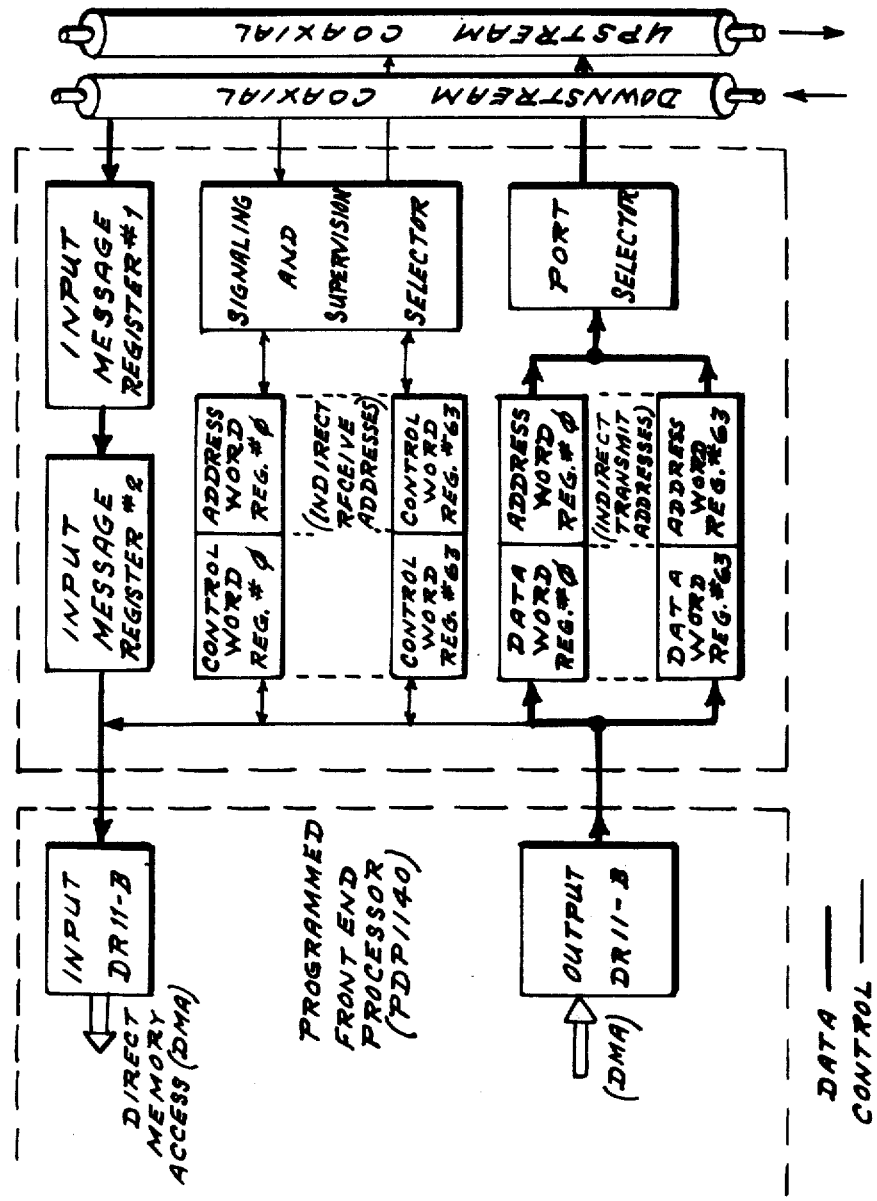

4,168,532

MULTIMODE DATA DISTRIBUTION AND CONTROL APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a multiplex telecommunications system, and in particular to an asynchronous, multidata mode time division multiplex transmission system.

In the prior art it is well known that the communications facilities which interconnect the various sensors and information processors are an important element of Command and Control systems. These communications facilities must be capable of handling a wide variety of analog and digital signals for voice, data and video traffic. During the last few decades substantial improvements have been made in the capabilities of long haul wideband trunk communications systems by employing microwave troposcatter radio links and communications satellite links. For local signal distribution on an air base, within a local operating area or in command center complexes, communications were handled primarily by means of individual pairs of wires, cables or radio links interconnecting each user or equipment. At the present time, broadband communications over coaxial cable and through optic fibers are now state-of-the-art. Technological advances in digital technology permit the implementaton of low cost frequency division and time division multiple access to a broadband bus. A variety of communication services then becomes possible for many users. Command and control communications in the future should be capable of handling multimegabit data rates and multi-channel secure telephone and video transmission. The presentation of remote radar and other surveillance signals, as well as the standard visual display terminal information, will be accommodated. The technical capability of accomplishing these multiple services under a single communication control utilizing a single transmission medium will permit the dynamic reallocation of communication resources in accordance with demand.

SUMMARY OF THE INVENTION

The present invention utilizes a multimode data distribution and control apparatus to transmit control and data distribution signals on separate frequency channels of the same multi-channel cable. The control channel performs signalling and supervision functions with the aid of a network control processor and operates using a form of polled, asynchronous, time division multiplex transmission. The data distribution channel transmits messages to their proper destinations also using a form of polled, asynchronous, time division multiplex transmission. The data rate to any particular subscriber terminal is automatically adapative to the traffic activity demands of each terminal, by monitoring an output buffer in each terminal interface. Thus, as the output buffer fills up, the polling rate to that terminal is increased to provide a high data rate transfer and as the buffer is emptied, the polling rate decreases to a lower effective data rate.

It is one object of the present invention, therefore, to provide an improved multiplex telecommunications system for simultaneously transmitting digital data, video and voice traffic.

It is another object of the invention to provide an improved multiplex telecommunications system wherein control and data signal are transmitted on separate frequency channels of the same multi-channel cable.

It is yet another object of the invention to provide an improved multiplex telecommunications system wherein the data rate is adaptive to the traffic activity demands of each terminal.

It is still another object of the invention to provide an improved multiplex telecommunications system having improved performance characteristics over known similar circuits.

These and other advantages, objects and features of the invention will become more apparent from the following description taken in conjunction with the illustrative embodiment in the accompanying drawings.

BRIEF DESCRIPTION OF THE DRAWINGS

FIG. 5 is a block diagram of the multiport data buffer unit.

DESCRIPTION OF THE PREFERRED EMBODIMENT

Figure 1:
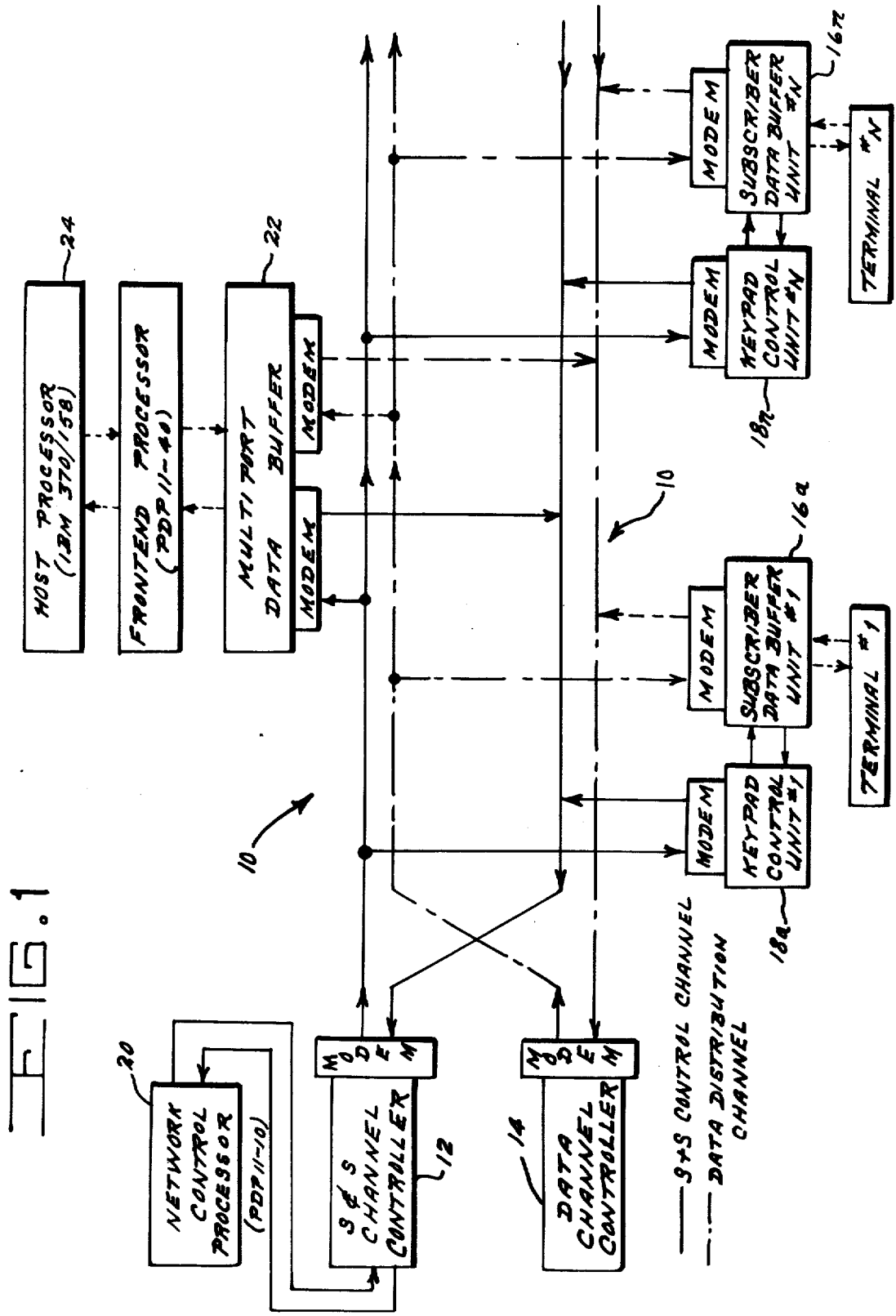
FIG. 1 is a block diagram of the data distribution and control network system in accordance with the present invention.

Referring now to FIG. 1, there is shown a block diagram of the control and data distribution units for a multimode information distribution system. The transmission path is a wideband coaxial cable 10 of 300 MHz bandwidth. Separate upstream and downstream cables are used to minimize mutual interference. Control and data distribution signals are transmitted on separate frequency channels of the same multi-channel cable 10. The channel controller 12 performs the signaling and supervision function. The data distribution channel 14 transmits messages to their proper destinations. Each subscriber data buffer unit 16 a-n contains a propagation-delay equalizer that is adjusted during the initial system line-up procedure. The time delay equalizers compensate for the difference in distance that exists between terminals close-in to the channel controller as compared to terminals at the far-end of the cables. The combination of the delay equalizers plus the provision of an inter-message frame gap prevents messages in one time slot from overlapping messages in adjacent time slots. The signaling and supervision (S+S) control channel terminates in a network control processor 20 such as a PDP-11 minicomputer or equivalent. A minicomputer is required since the network will eventually provide many more services than just data transmission and distribution.

The S+S channel controller 12 provides the path for accepting request-for-service signals from subscribers' terminals and for sending status and address information back to subscriber terminals. The S+S subsystem uses a form of polled, asynchronous, time-division-multiplex transmission. The polling from the S+S channel controller is initiated by a flag-for-service request from the subscriber's terminal. There are 64 signaling and supervision time groups in a time frame. The time group is divided into a flag-for-service field, a polling field and an information field. The flag-for-service field contains 256 bit times. This quantity of bit-times repeated over 64 time groups yields 16,384 bit positions. A flag-for-service technique is used to handle requests for service from any of 16,384 subscribers. Each subscriber's keypad 18 a-n is assigned a code (directory address) which corresponds to a unique bit position in the field of 16,384 bits in the time frame. Starting with the beginning of each time frame, the keypad logic counts each bit received on the downstream cable until its assigned bit position is reached. At this point in time, the keypad logic sends a flag-for-service pulse on the upstream cable. In the meantime the subscriber may enter his service request by depressing the the appropriate keys on the keypad of the keypad control unit 18a.

The channel controller 12 recognizes the flag-for-service pulse because of its time position and then polls that subscriber by sending the address of his keypad in the next available polling field. When the keypad recognizes its polling address on the downstream cable, it responds by transmitting the stored keystrokes and status information on the upstream cable during the time occupied by the 48-bit information field. The channel controller accepts the keystroke-status information which conveys the subscriber's request and forwards it to the network control processor. The remaining 63 time groups in the same time frame are available for "simultaneous" servicing of other subsribers.

The network control processor 20 then checks availability of equipment involved in the desired connection. Presuming availability, the network control processor 20 sends the necessary indirect-address information to the keypad control unit 18a for transfer to the subscriber data buffer unit 16. Data transmission between subscribers may then begin on the data distribution channel.

The digital data distribution subsystem is based on a form of polled, time-division multiplexing. This subsystem will accommodate up to 1024 simultaneous data users. The data distribution channel controller 14, sequentially polls all 1024 addresses in its polling table. These addresses are not permanently assigned to any particular terminal and do not correspond to the fixed address of the terminal's keypad. For this reason the addresses used in the digital data distribution subsystem are called indirect addresses. The indirect addressing feature is used to allow up to 1024 terminal connections to time-share the data channel out of a population of 16,384 subscribers.

During the polling (transmitter) address field time the data channel controller 14 sends on the downstream cable the address of the terminal which is expected to transmit. When the polled terminal recognizes its address, it uses the remaining 85 bit-times to send its data messages on the upstream cable. The data message contains a control/receiver address field followed by an information field. The information field contains the remaining 68 bits which consist of four 16-bit words with each word followed by a single parity bit. The data channel controller 14 passes the upstream data message to the downstream cable following the next available polling address field. During this downstream transmission the receiving terminal accepts the data messages previously inserted by the transmitting terminal. This completes a typical transmit-to-receive cycle.

In order to provide simultaneous multiple terminal access to common-user facilities such as a data processing computer, a multiport data buffer unit 22 is utilized. The multiport data buffer 22 is capable of providing communication between 64 terminals on the cable and a large host-processor computer 24. The host processor 24 would interface to the multiport data buffer through a front-end-processor 26 such as a PDP 11–40 minicomputer. The advantage of using the multiport data buffer unit over individual subscriber data buffer units for such access is that common circuits may be used. For example, only one set of modems is required by the multiport data buffer unit 22 to interface the cable. Thus, the many-to-one connectivity of multiple terminals to a host computer is economically achievable.

One unique feature of the digital data distribution system is that the data rate to any particular terminal is automatically adapted to fulfull the traffic activity demands of each terminal. The adaptive data rate permits the system to automatically switch a terminal from a basic 600 bps data rate to a higher speed of 19.2 kilobits per second as demanded by terminal traffic activity. Of the 1,024 simultaneous on-line terminals any 16 pairs of terminals are permitted the higher data rate as required. The interaction of the 600 bps and 19.2 kbps data rates can be visualized as two circular polling queues. The poll address selectors within the circular queues rotate at a different speed. The 600 bps data rate terminal devices are on the low-speed selector rotating at 10.56 revolutions per second. Terminal devices requiring 19.2 kbps data rate service are temporarily assigned to the high speed selector rotating at 338 revolutions per second. Alternate interleaving of poll addresses from the two queues provides the time division multiplex, TDM servicing of all terminals which may be active. Automatic adaptive data rate service is provided by monitoring the output buffer in each terminal interface device, thereby permitting efficient dynamic allocation of capacity. As the output buffer fills up, the polling rate to that terminal is increased providing a high data rate transfer and a rapid screen fill time for visual display terminals. As the buffer is emptied, the polling rate decreases to a lower effective data rate. This lower data rate is sufficient to handle normal keyboard activity at 15 characters/second yet maintains terminal connectivity so that rapid data transfer can take place without need for reestablishing a connection for each transmission.

Figure 2:
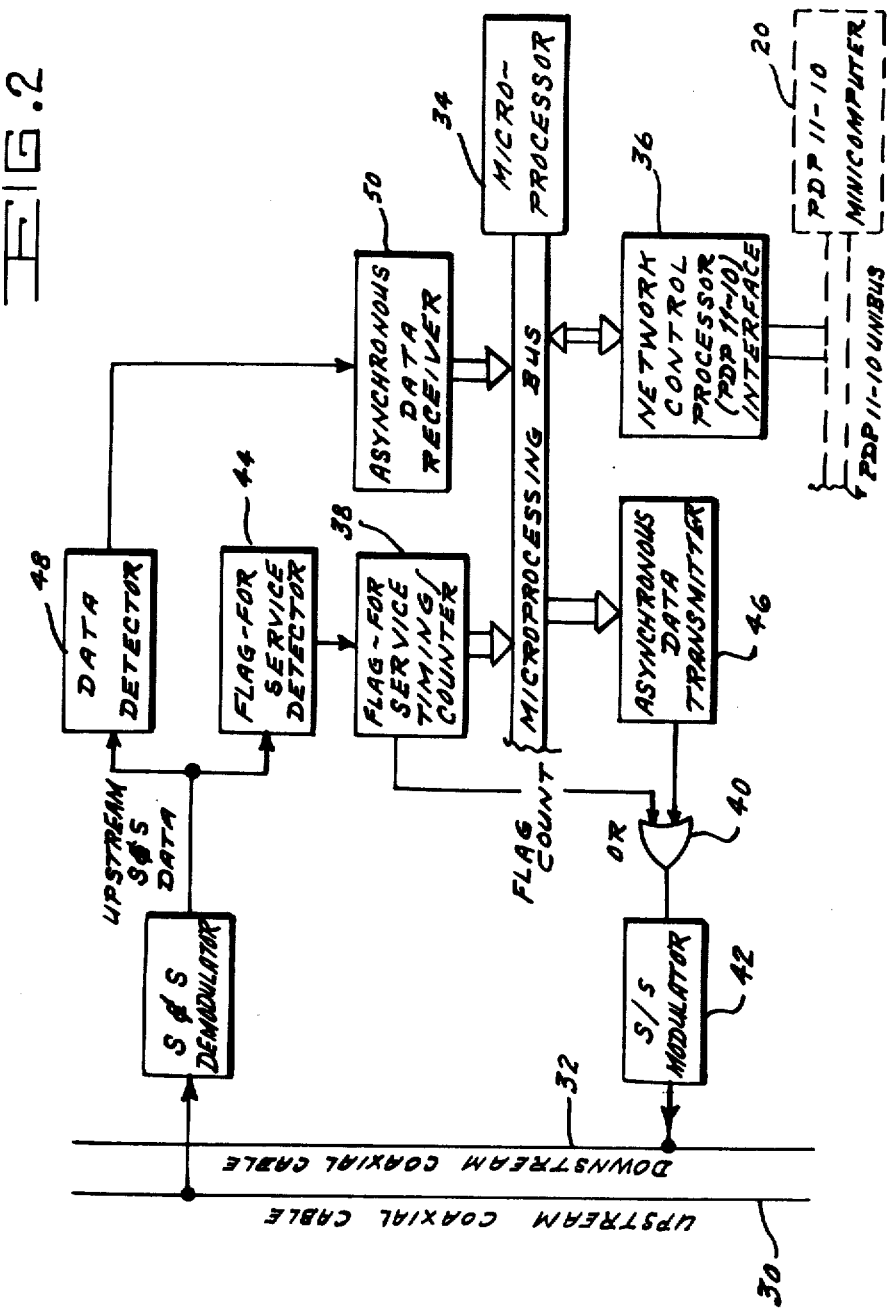
FIG. 2 is a block diagram of the signaling and supervision subsystem channel controller unit.

Turning now to FIG. 2, there is shown a signaling and supervision (S and S) channel controller unit which provides the interface between the upstream and downstream coaxial cables 30, 32 and the network control processor unit 20 of FIG. 1. The signaling and supervision controller unit is structured around a 16-bit microprocessor 34 which interfaces with the 16-bit PDP-11 minicomputer 20 through the interface unit 36. The channel controller provides the following functions: 1. performs the flag-for-service sequence, 2. performs the initial interrgation poll sequence, and 3. manages the data transfer between the network control processor and the digital data channel for all subsequent polling sequences.

The flag-for-service sequence is controlled by the flag-for-service timing/counter unit which sends a pulse train of 256 pulses (flag counts) via the OR gate 40 and S S modulator unit 42 to the downstream coaxial cable 32. The flag-for-service detector unit 44 monitors the upstream cable 30 to detect flag pulses sent by keypad control units. The pulse arrival times are matched against a counter to determine which keypad control unit generated the upstream flag pulse. The pulse count is then converted to a keypad address and transferred to the microprocessor 34 via the microprocessor bus. The microprocessor 34 then initiates polling of that specific keypad by sending the address downstream in the next available time group. This is accomplished by transferring the address in bit-parallel form to the asynchronous data transmitter 46. With each 14-bit address, two control bits are also sent. For the initial polling sequence, the control bits are both zeros. The asynchronous data transmitter 46 accepts the 16-bits in parallel from the microprocessor bus and for convenience in transmission divides and 16-bits into two 8-bit information characters and transmits the characters, bit-serial, in the start-stop asynchronous mode. The operation of the channel controller has thus far been independent of the network control processor, permitting the network control processor to execute its own internal functions without excessive interrupts.

Upon receipt of the initial addressed poll, the keypad control unit sends back keystroke or status information to the S and S data detector unit 48, and are then transferred to the asynchronous data receiver unit 50. The asynchronous data receiver unit 50 the interrupts the microprocessor 34 and transfers the information to the microprocessor 34 and transfers the information to the microprocessor which, in turn, interrupts the network control processor 20 (PDP-11) to transfer the keystroke information or status information. Subsequent keystroke or status information is accepted by the channel controller unit and continues to be passed to the network control processor Unit 20 (PEP-11) until enough information has been received to act on a subscriber's request. At that point, the PDP-11 processes the request and send the appropriate control and status informaton downstream via the S and S channel controller.

Figure 3:
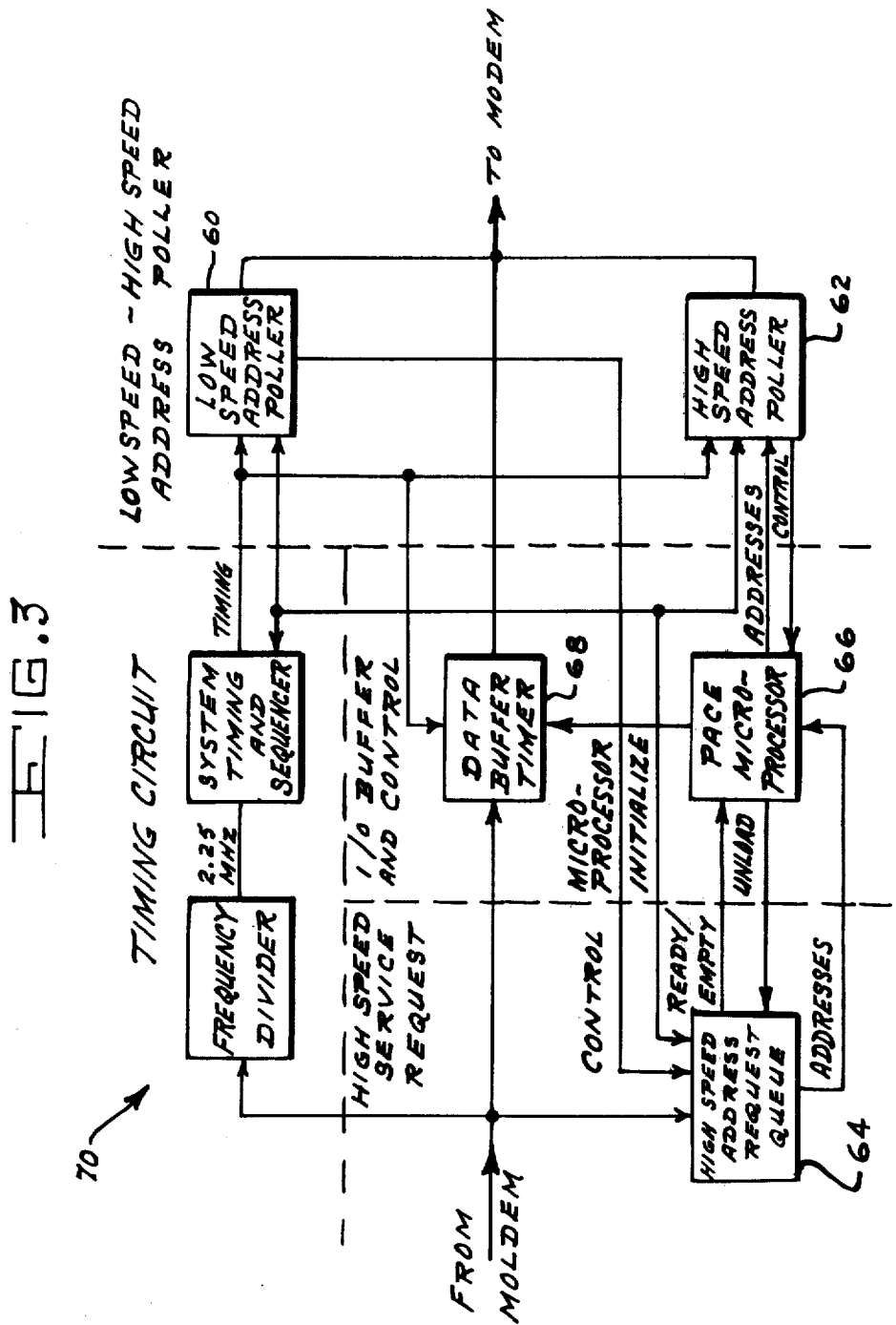
FIG. 3 is a block diagram of the data distribution subsystem channel controller unit.
Figure 4:
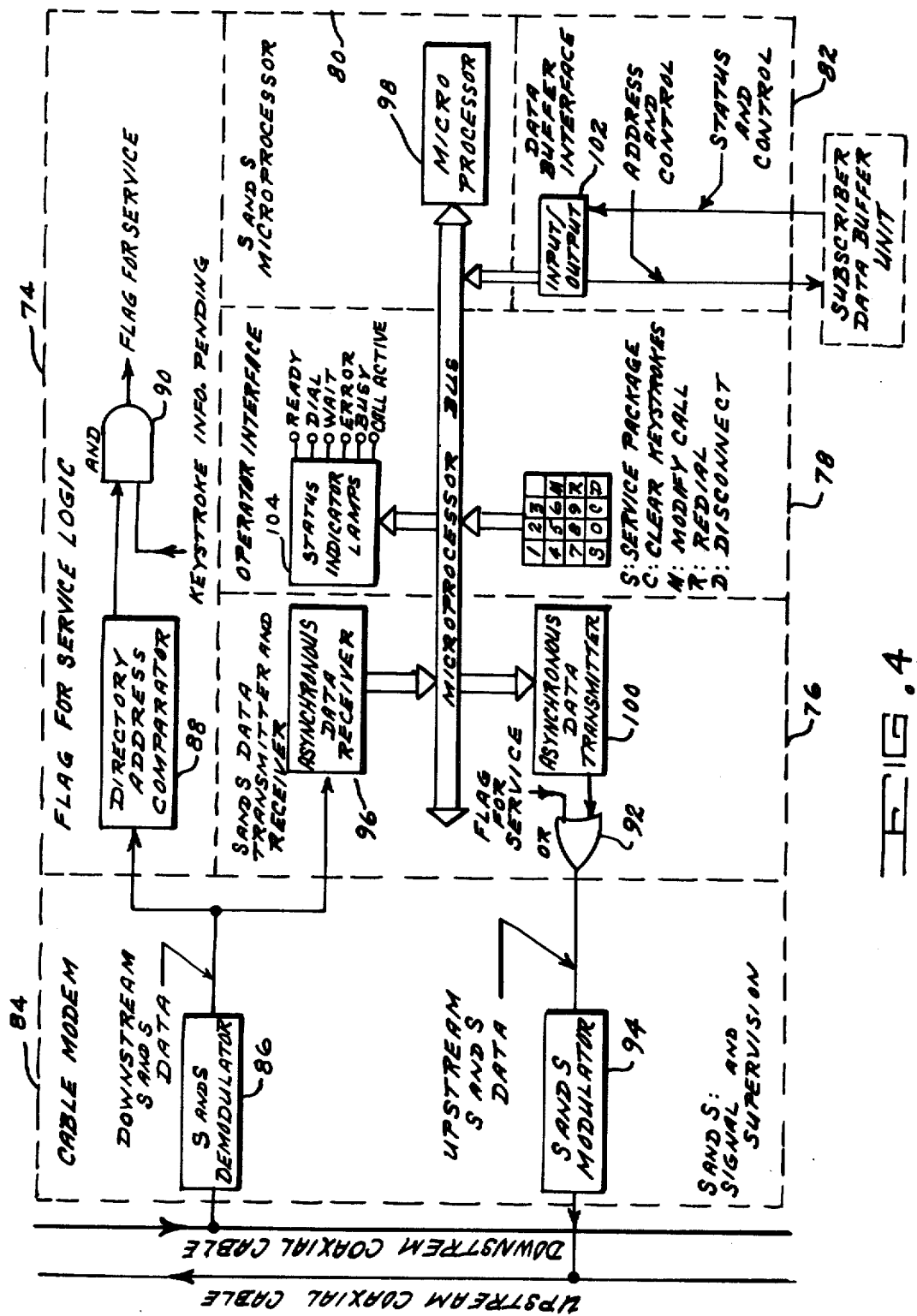
FIG. 4 is a block diagram of the keypad control unit.

There is shown in FIG. 3, the data distribution subsystem channel controller which generates the polling addresses used for low and high speed service and transmits them to all terminal devices via the downstream cable. The polls provide the synchronization and control necessary for transmission of digital data messages on the upstream cable from a large number of terminals. The controller then retransmits these messages onto the downstream cable. FIG. 3 may be thought of as being divided into four functional blocks; 1. timing circuits, 2. low-speed and high-speed address poller, 3. request for high-speed service circuitry, 4. microprocessor, and 5. input/output buffer. The timing circuits block 70 provides the clock signals required to keep the logic circuits within the channel controller synchronized. The low-speed and high-speed poller block contains a low-speed address poller buffer 60 and a high speed address poller buffer 62. The control circuits toggle back and forth between these two buffers and transmit the polling addresses via the modulator on the downstream cable. The request for high-speed service unit 64 is used to examine the messages coming from the terminals. If the message contains a high-speed service control bit set to 1, that address is stored in a buffer called the high-speed address request queue. Whenever the queue receives an address, it sets a Ready flag for the microprocessor 66. The microprocessor 66 retrieves the address and stores it in a high-speed address table within the microprocessor memory. Once every polling cycle the microprocessor 66 loads the high-speed address table into the high-speed address poller 62. The input/output buffer 68 receives the data from the upstream cable and stores it for transmission of the down-stream cable during the next group.

The keypad control unit provides the man/machine interface with the signaling and supervision subsystem via the keypad and its associated status lamps. The keypad control unit consists of logic circuitry and a cable modem for interfacing the keypad and indicator circuits to the coaxial cable. It also contains the interface between the S and S subsystem and the Subscriber Data Buffer Unit.

The keypad control unit is subdiviced into the six functional blocks comprising: 1. flag-for-service logic, 74; 2. S and S data transmitter and receiver, 76; 3. operator interface, 78; 4. S and S microprocessor, 80; 5. data buffer interface, 82; and 6. the cable modem, 84.

The serial bit stream from the downstream cable is converted from RF to DC voltage levels by the demodulator unit 86 of the cable modem. The DC-level bit stream is supplied to the flag-for-service logic unit 74, and the S and S data transmitter and receiver logic unit 76. The directory address comparator 88 counts the pulses in the flag-for-service field in the downstream message until it reaches a count comparable to the address number of its own keypad control unit. At this time it changes the input level to the AND gate 90. If there is also keystroke status information residing in the keypad unit, the AND gate 40 is enabled which originates a flag-for-service. The flag-for-service pulse is thus applied to the OR gate 92 in the S and S data transmitter and receiver unit 76. This pulse passes through the OR gate 92 to the modulator 90 which converts it to RF for transmission on the upstream cable. It is received by the S and S channel controller which completes the flag-for-service subsequence.

When the flag-for-service field of the downstream S and S message has reached its terminal count of 255, the keypad control unit disables the flag-for-service logic unit 74 and enables the S and S data transmitter and receiver unit 76. The asynchronous data receiver 96 (ADR) then accepts the next six 8-bit characters. After the receipt of the first character, the ADR 96 sends an interrupt signal to the microprocessor 98. The eight bits are transferred in two successive parallel 4-bit groups to the microprocessor 98 RAM memory via the microprocessor bus. The micro-98 examines the first 4-bit group to determine if they contain the keypad control unit's polling address. The four-bit groups are equivalent to the 16-bit computer word sent by the PDP-11 network control processor. If a match is found in the 14-bit address field, the last two bits ae decoded to determine which control mode applies to the next two words.

When the control mode is 00, the microprocessor 98 interprets these words as an interrogation poll. The microprocessor 98 responds by sending the keystroke/status information via the microprocessor bus structure to the asynchronous data transmitter 100. The asynchronous data transmitter 100 assembles two 4-bit groups into an 8-bit character and transmits them in bit serial mode via the OR gate 92 and modulator 94 interface to the upstream cable.

When the control bits are 01, the microprocessor 98 interprets them as a command poll. The next four characters contain an indirect receiver address and a transmitter address. The microprocessor 98 stores these address words and retransmits them in 4-bit groups to the input/output unit 102 in the data buffer interface unit 82. The data buffer interface 82 performs the complete equipment interface between the keypad control unit and the subscriber's data buffer unit.

When the control bits are 10, the microprocessor 92 interprets the as a command poll with the next four characters containing status light information. The microprocessor 98 sends the appropriate lamp information via the microprocessor bus to the subscriber status lamp driver unit 104.

There is shown in FIG. 5 a multiport data buffer unit which contains 64 registers for control words that are built during the call set up by the signaling and supervision subsystem. In association with each control word, an address register is provided which will contain and identify the indirect receiving address of incoming data messages. The control word register itself also contains characteristics of the subscriber terminal device that is requesting a time-shared connection. These characteristics include such information as the subscriber terminals's data rate, type of code and format. The information stored in the control word and associated address word register is transferred to the front-end-processor as part of the initial call set up routine. It should be noted that the 10-bit address word is not transferred to the front-end-processor but only the seven low-order bits which define a block of 128 addresses. The digital data channel controller reserves the first 128 addresses in the sequence of 1024 addresses for the multiport data buffer unit.

When an incoming data message is recognized on the downstream cable, the multiport data buffer circuit examines the address in the message to see if it matches any of the addresses in the bank of receiving addresses. If a match is found, the data information portion of the message is stored in input message register no. 1. The register's contents are then transferred bit parallel to input message register No. 2. The use of the double buffer arrangement frees input message register No. 1 for accepting in bit-serial mode another message from the downstream cable.

When a data message is subsequently received, only the access port address and the actual data portion of the message is transferred to the front-end-processor. The transfer control process is via a direct memory access. The single direct memory access. The single direct memory access (DMA) transfer of the address word and the four data words is faster than a succession of five normal transfers. The direct memory access procedure is used to assure that the content of input message register No. 2 is forced into memory so that the multiport data buffer unit will not cause a backup on the downstream cable.

Messages from the host processor to be transmitted on the upstream cable are received by the multiport data buffer unit from the front-end-processor. A direct memory access feature is also used in the upstream direction. The multiport data buffer unit contains a bank of holding registers to handle the upstream coaxial cable messages. This bank of registers includes 64 data word registers and their associated indirect transmit (upstream) address word registers. The data word register contain the actual data information in four 16-bit words. The address word registers contain the indirect transmit address assigned by the front-end-processor, and related to the receiving address by adding 16. The port selector circuit is activated after detection of the polling address on the downstream cable. The port selector accesses the corresponding data word register and causes the words to be read out onto the upstream coaxial cable.

Although the invention has been described with reference to a particular embodiment, it will be understood to those skilled in the art that the invention is capable of a variety of alternative embodiments within the spirit and scope of the appended claims.

What is claimed is:

1. A multimode data distribution and control apparatus comprising in combination:
   remote terminals providing data and control signals,
   means for processing data and control signals from said remote terminal, said processing means utilizes said control signal to recognize requests for data from remote terminals and to provide the required message codes for the transfer of data between remote terminals, said processing means utilizing time division multiplexing for the transmission and receipt of data and control signals, said processing means receives data signals from one remote terminal for transmittal to a second remote terminal, said processing means indexing incoming data signals with an address code and transmitting the address-coded data signals to the receiving terminal,
   a coaxial cable providing a plurality of multiplexing channels therein, each terminal of said plurality of multiplexing channels providing a two-way transfer of signals, said two-way transfer of signals being upstream and downstream from said processing means, a first channel to transfer data signals, a second channel to transfer control signals, and
   a plurality of data/control units for transmitting and receiving data between each data/control unit of said plurality of data/control units, each of said plurality of data control units comprising a different one of said remote terminals which are remote to each other and to said processing means, said remote terminals being connected to said coaxial cable and thereby connected to said processing means, each of said plurality of data/control units being connected respectively to said first and second channel of said coaxial cable, each of said plurality of data control units transmitted and receiving control signals from said data processing means, each of said plurality of data/control units transmitting on demand data signals to said processing means, said data signals having a data signal rate, each of said data signal rates being equal to or different from one another, each of said data/control units having a data rate change means to change the state of the data rate signal in accordance with the state of the respective data/control unit, said data signal rate being variable according to the capability and state of the respective data/-control unit, each data/control unit transmitting a rate signal indicating the loading state of the transmitting data/control unit, said rate signal being transmitted with said data signals.

2. A multimode data distribution and control apparatus as described in claim 1 further including a host processor unit to provide data distribution at on automatically variable data traffic rate, said data traffic rate varies directly as the demand from said plurality of data/control units, a front-end processor connected to said host processor unit to provide data signals to and from said host processor unit, and, a multiport data buffer unit connected to said first and second channels respectively to receive and transmit data and control signals therefrom, said multiport data buffer unit being connected to said front-end processor to provide data signals thereto.

3. A multimode data distribution and control apparatus as described in claim 1 wherein said first and second channels respectively have an upstream and a downstream cable therein for the transmission of information.

4. A multimode data distribution and control apparatus as described in claim 1 wherein said plurality of data/control units may equal up to 1024 units.

5. A multimode data distribution and control apparatus as described in claim 2 wherein said data traffic rate may be varied from 600 bits/second up to 19.2 kilobits/second.

* * * * *